(12) United States Patent
Po

(10) Patent No.: US 11,702,821 B2
(45) Date of Patent: Jul. 18, 2023

(54) SMART READING DEVICE FOR WATER METER AND CONTROLLING METHOD THEREOF

(71) Applicants: ACER BEING COMMUNICATION INC., Taipei (TW); Acer Incorporated, New Taipei (TW)

(72) Inventor: Chan-Ping Po, Taipei (TW)

(73) Assignees: ACER BEING COMMUNICATION INC., Taipei (TW); Acer Incorporated, New Taipei (TW)

( * ) Notice: Subject to any disclaimer, the term of this patent is extended or adjusted under 35 U.S.C. 154(b) by 300 days.

(21) Appl. No.: 17/134,194

(22) Filed: Dec. 25, 2020

(65) Prior Publication Data

US 2022/0205228 A1 Jun. 30, 2022

(51) Int. Cl.
| | |
|---|---|
| *G01D 4/00* | (2006.01) |
| *G06V 30/148* | (2022.01) |
| *G01F 1/66* | (2022.01) |
| *E03B 7/07* | (2006.01) |
| *G06V 30/10* | (2022.01) |

(52) U.S. Cl.
CPC .............. *E03B 7/072* (2013.01); *G01D 4/006* (2013.01); *G01D 4/008* (2013.01); *G06V 30/10* (2022.01); *G06V 2201/02* (2022.01)

(58) Field of Classification Search
None
See application file for complete search history.

(56) References Cited

U.S. PATENT DOCUMENTS

| | | | | |
|---|---|---|---|---|
| 2017/0234709 | A1* | 8/2017 | Mackie ................. | G01M 3/243 73/861.08 |
| 2017/0364734 | A1* | 12/2017 | Melugin ................ | G06V 20/63 |
| 2018/0052008 | A1 | 2/2018 | Maman et al. | |
| 2020/0116523 | A1* | 4/2020 | Peat ....................... | G01D 4/004 |

(Continued)

FOREIGN PATENT DOCUMENTS

| | | | |
|---|---|---|---|
| EP | 1909073 | 4/2008 | |
| EP | 1909073 A1 * | 4/2008 | ............. G01D 4/004 |

(Continued)

OTHER PUBLICATIONS

International Search Report EP 21152409 (dated 2022).*

(Continued)

*Primary Examiner* — Curtis A Kuntz
*Assistant Examiner* — Jerold B Murphy
(74) *Attorney, Agent, or Firm* — JCIPRNET

(57) ABSTRACT

A smart reading device for a water meter and a controlling method thereof are provided. The smart reading device includes a fixing component, a casing, an image capturing component, an image analyzing component, and a transmitting component. The fixing component is used to be fixed onto the water meter. The casing is disposed on the fixing component. The image capturing component is disposed in the casing for capturing a numerical display area of the water meter so as to obtain a water consumption image. The water consumption image is analyzed by the image analyzing component or a relay device to obtain a water consumption value. The transmitting component is used for transmitting the water consumption value or the water consumption image to the relay device.

21 Claims, 13 Drawing Sheets

(56) References Cited

U.S. PATENT DOCUMENTS

2020/0196030 A1* 6/2020 Chiu .................. H04Q 9/02
2022/0146283 A1* 5/2022 Wu .................. G01F 15/068

FOREIGN PATENT DOCUMENTS

| ES | 2311363 | | | 2/2009 | |
|----|---------|----|---|--------|---|
| ES | 2311363 | A1 | * | 2/2009 | |
| JP | 4117605 | B2 | * | 7/2008 | ............ G01D 4/004 |
| JP | 2011081715 | A | * | 4/2011 | |
| WO | 2009043065 | | | 4/2009 | |

OTHER PUBLICATIONS

JP4117605 English Language Translation (Year: 2008).*
ES 2311363 English Language Translation (Year: 2009).*
EP 1909073 English Language Translation (Year: 2008).*
JP 2011081715 English Language Translation (Year: 2011).*
"Search Report of Europe Counterpart Application", dated Jun. 18, 2021, p. 1-p. 8.

* cited by examiner

SMART READING DEVICE FOR WATER METER AND CONTROLLING METHOD THEREOF

BACKGROUND

Technical Field

The disclosure relates to a reading device and a controlling method thereof, and in particular to a smart reading device of a water meter and a controlling method thereof.

Description of Related Art

With the advancement of technology, various smart home appliances continue to evolve. An example of smart home appliances is a smart water meter, which automatically reads the water consumption so as to facilitate the control and management of water resources, which is helpful for promoting energy saving and carbon reduction.

However, when consumers want to install smart water meters, they need to remove the traditional water meters and even carry out a construction of pipelines. This method requires a relatively high cost, which affects the consumers' willingness to install smart water meters.

In addition, smart water meters need to be certified by relevant agencies to ensure their accuracy. The certification procedure is quite cumbersome, which makes it difficult to promote the application of smart water meters.

Furthermore, the diameters of different water pipes are different, and smart water meters may not be suitable for all homes or places.

Therefore, researchers are committed to developing a smart reading device to equip the traditional water meters with the functions of smart water meters so as to achieve the purpose of water resource control and management.

SUMMARY

The disclosure relates to a smart reading device of a water meter and a controlling method thereof. The smart reading device is adapted to be directly installed onto a traditional water meter, so that consumers can equip the traditional water meter with the functions of the smart water meter without having to remove the original water meter or spend high costs on construction. In this way, the smart reading device may be widespread in various homes and places so as to effectively control and manage water resources.

According to one aspect of the disclosure, embodiments of the disclosure provide a smart reading device of a water meter. The smart reading device includes a fixing component, a casing, an image capturing component, an image analyzing component, and a transmitting component. The fixing component is used to be fixed onto the water meter. The casing is disposed on the fixing component. The image capturing component is disposed in the casing. The image capturing component is used for capturing a numerical display area of the water meter so as to obtain a water consumption image. The water consumption image is analyzed through the image analyzing component or a relay device to obtain a water consumption value. The transmitting component is used for transmitting the water consumption value or the water consumption image to the relay device.

According to another aspect of the disclosure, embodiments of the disclosure provide a controlling method of a smart reading device of a water meter. The smart reading device is configured on the water meter. The controlling method of the smart reading device includes the following steps: determining whether a predetermined time is reached; if the predetermined time is reached, capturing a numerical display area of the water meter so as to obtain a water consumption image; analyzing the water consumption image through an image analyzing component or a relay device so as to obtain a water consumption value; and transmitting the water consumption value.

DESCRIPTION OF THE EMBODIMENTS

Figure 1:
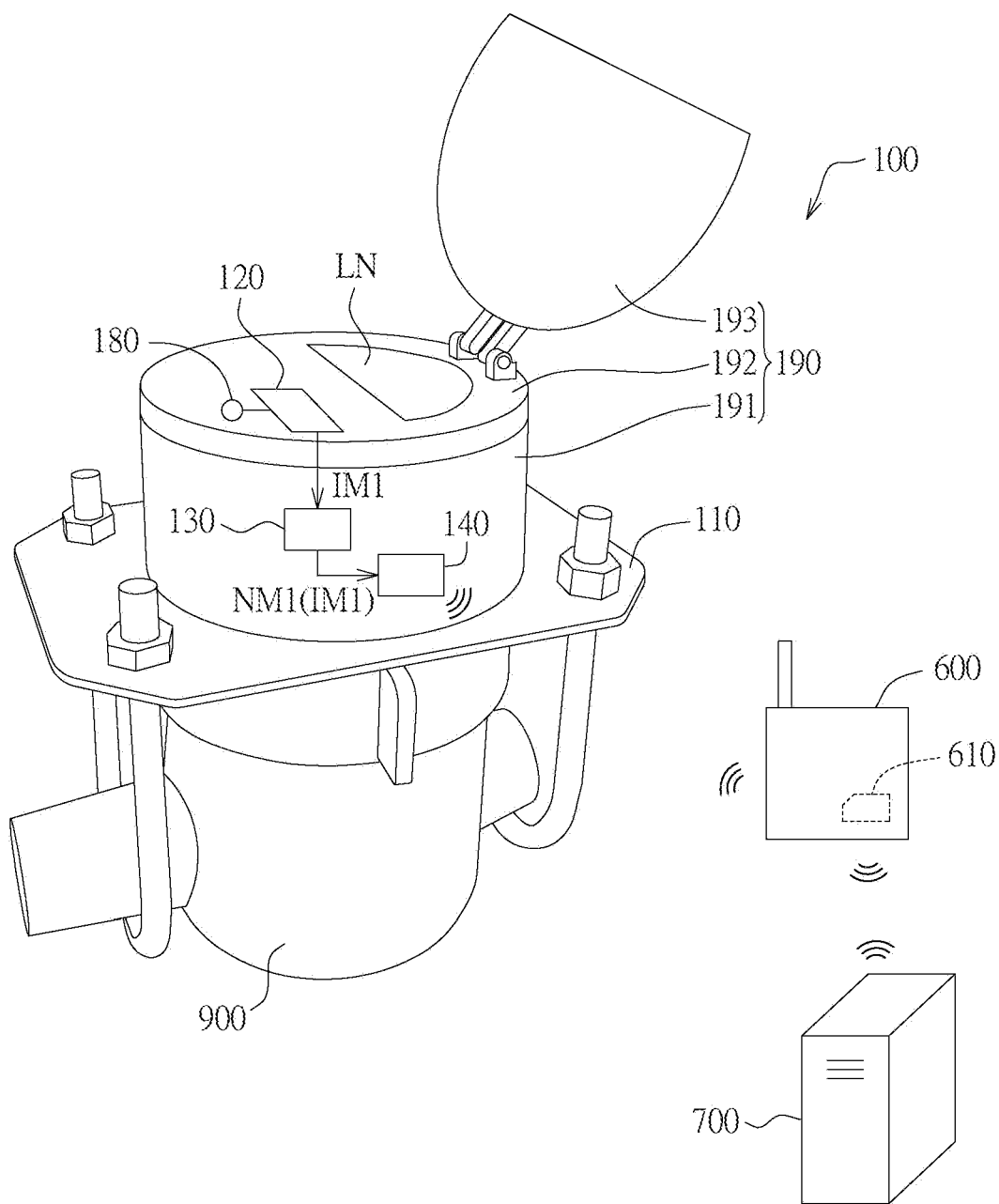
FIG. 1 shows a schematic view of a smart reading device and a water meter according to (but not limited to) an embodiment.

Reference is made in detail to the exemplary embodiments of the disclosure as follows, and examples in the exemplary embodiments are illustrated in the accompanying drawings. Whenever applicable, the same reference symbols are used in the drawings and the descriptions to indicate the same or similar parts.

Referring to FIG. 1, FIG. 1 shows a schematic view of a smart reading device 100 and a water meter 900 according to (but not limited to) an embodiment. The smart reading device 100 of this embodiment may be directly installed onto the traditional water meter 900. Consumers can equip the traditional water meter 900 with the functions of a smart water meter without having to replace the original water meter 900 or spend high costs on construction. In this way, the smart reading device 100 may be widespread in various homes and places so as to effectively control and manage water resources.

As shown in FIG. 1, the smart reading device 100 includes at least a fixing component 110, a casing 190, an image capturing component 120, a luminous component 180, an image analyzing component 130, and a transmitting component 140. The fixing component 110 is used to be fixed onto the water meter 900. The casing 190 is disposed on the fixing component 110. The image capturing component 120 is disposed in the casing 190. The image capturing component 120 is used for capturing a numerical display area R1 (shown in FIG. 2) of the water meter 900 so as to obtain a water consumption image IM1. The water consumption image IM1 is analyzed through the image analyzing component 130 (or a relay device 600) to obtain a water consumption value NM1. The transmitting component 140 is used for transmitting the water consumption value NM1 (or the water consumption image IM1) to the relay device 600. The relay device 600 then transmits the water consumption value NM1 to a main server 700.

In an embodiment, multiple smart reading devices 100 may be collectively configured near the water tower on the top floor of a building, and the number of the multiple smart reading devices 100 is, for example, more than 30. The multiple smart reading devices 100 transmit data to the nearby relay device 600 (an industrial data acquisition module (IDAM), for example) through Bluetooth technologies. Then, the relay device 600 integrates the data into a packet, for example, and transmits the data to the main server 700 through a 4G-LTE/NB-IOT module. In this way, one only needs to insert a SIM card 610 into the relay device 600, and there is no need to insert the SIM cards 610 into all the smart reading devices 100 and enable each of the smart reading devices 100 to communicate with the main server 700 individually. In this way, the problem of mutual communication interference between the smart reading devices 100 is alleviated. For example, in the LORA standard communication protocol, a device does not detect whether other devices are communicating before the device sends a signal. Therefore, when the number of the water towers on the top floor is higher, the transmission signals between each other are more likely to interfere with each other. Also, in this way, the problem of signal transmission loss may also be alleviated. For example, in the LORA standard communication protocol, once a signal is transmitted, the signal is not retransmitted even if the transmission fails. However, through the design of the relay device 600, the relay device 600 checks whether a signal is successfully transmitted, and if the transmission fails, the signal may be retransmitted. In addition, the relay device 600 may reduce the communication cost, such as the cost of configuring the SIM card 610 in each of the smart reading devices 100, and reduce communication bandwidth requirements.

In addition, as shown in FIG. 1, the casing 190 includes a base 191, a top board 192, and a flip cover 193. The top board 192 is connected to the base 191. The top board 192 has a convex lens LN. The flip cover 193 is connected to the top board 192. When the flip cover 193 is opened, the luminous component 180 is activated, so that users can view the numerical display area R1 (shown in FIG. 2).

The image capturing process of the image capturing component 120 is similar to the process of darkroom photography. The luminous component 180 provides a flash. In one embodiment, the lens of the image capturing component 120 may not have an autofocus function and may have a fixed focal length, so as to reduce the cost of the image capturing component 120. Since the distance between the image capturing component 120 and the water meter 900 is fixed, the need for the autofocus function is quite low.

Figure 2:
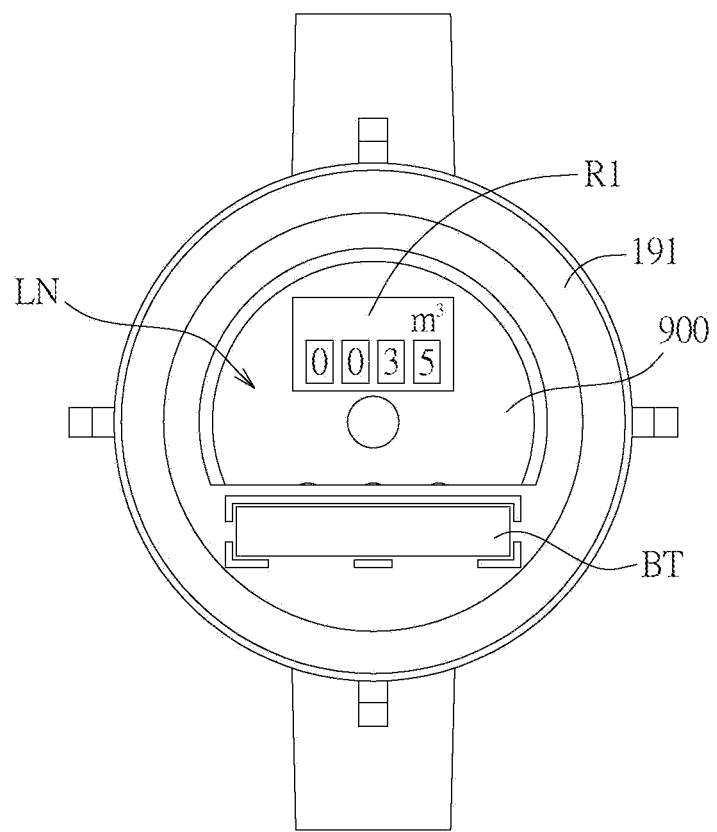
FIG. 2 shows a top view of a base and the water meter of FIG. 1.

Referring to FIG. 2, FIG. 2 shows a top view of the base 191 and the water meter 900 of FIG. 1. The smart reading device 100 further includes a battery BT. The battery BT is, for example, a lithium battery. Users can replace the battery BT once they open the top board 192. This design makes it easier to replace the battery BT, so as to reduce the cost of replacement of the battery BT. In an embodiment, the service life of the battery BT is substantially seven or eight years.

In addition, the smart reading device 100 may include a lead seal. The lead seal is used for connecting a lead block with a steel rope to avoid the setting from being adjusted or changed by people of bad intentions, thereby having an anti-theft design. In an embodiment, the smart reading device 100 may have a proactive detecting function, such as a gravity sensor (G-sensor) which detects whether the lead block is moved, or a connecting port which detects whether the lead block is picked up and a disconnection occurs. If an anomaly is detected, the smart reading device 100 may proactively send anomaly information to the main server 700 immediately.

In an embodiment, the height of the casing 190 is 20 cm or less, so that the smart reading device 100 may be installed according to the specification of the water meter 900. For example, if the multiple water meters 900 are configured vertically, when the casing 190 exceeds 20 cm, the top board 192 may not be opened. For example, the top board 192 may collide with the bottom of another water meter. By reasonably limiting the height of the casing 190, both costs and convenience are taken into account.

Furthermore, if the installation process of a smart reading device 100 does not go smoothly, an on-site installer may activate Bluetooth through an application (app), and display the setting values of the smart reading device 100 on a handheld device to facilitate installation operations. In addition, the installer may adjust the setting values through a debug port to obtain or overwrite the setting values. In an embodiment, when the on-site installer approaches a smart reading device 100 with an electronic device, the smart reading device 100 may be automatically connected to the application on the electronic device and display the setting values, for example, through a Bluetooth connection.

Figure 3:
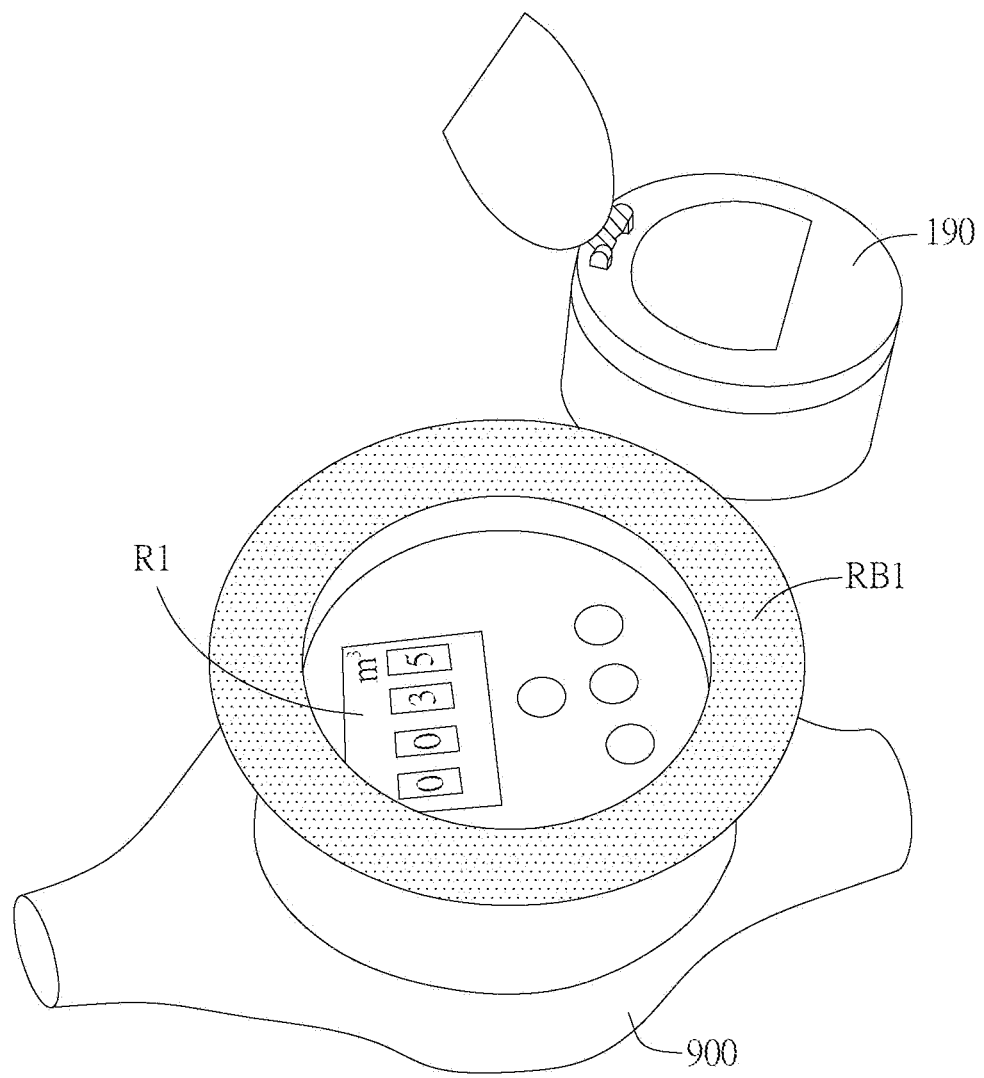
FIG. 3 shows an exploded view of the water meter and a casing of FIG. 1.
Figure 4:
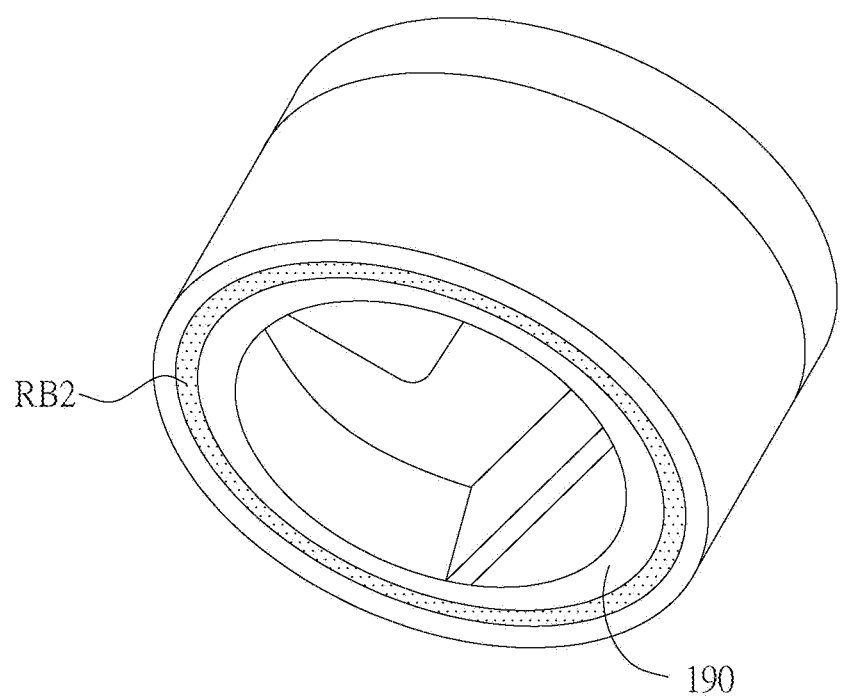
FIG. 4 shows a rear view of the casing of FIG. 1.

Referring to FIGS. 3 and 4, FIG. 3 shows an exploded view of the water meter 900 and the casing 190 in FIG. 1, and FIG. 4 shows a rear view of the casing 190 in FIG. 1. A rubber gasket RB1 may be configured between the water meter 900 and the casing 190, and a rubber ring RB2 may be configured below the casing 190. In this way, the smart reading device 100 has a waterproof function and the connecting area may be covered so as to prevent water vapor from covering the numerical display area R1, which may cause an erroneous determination.

Figure 5:
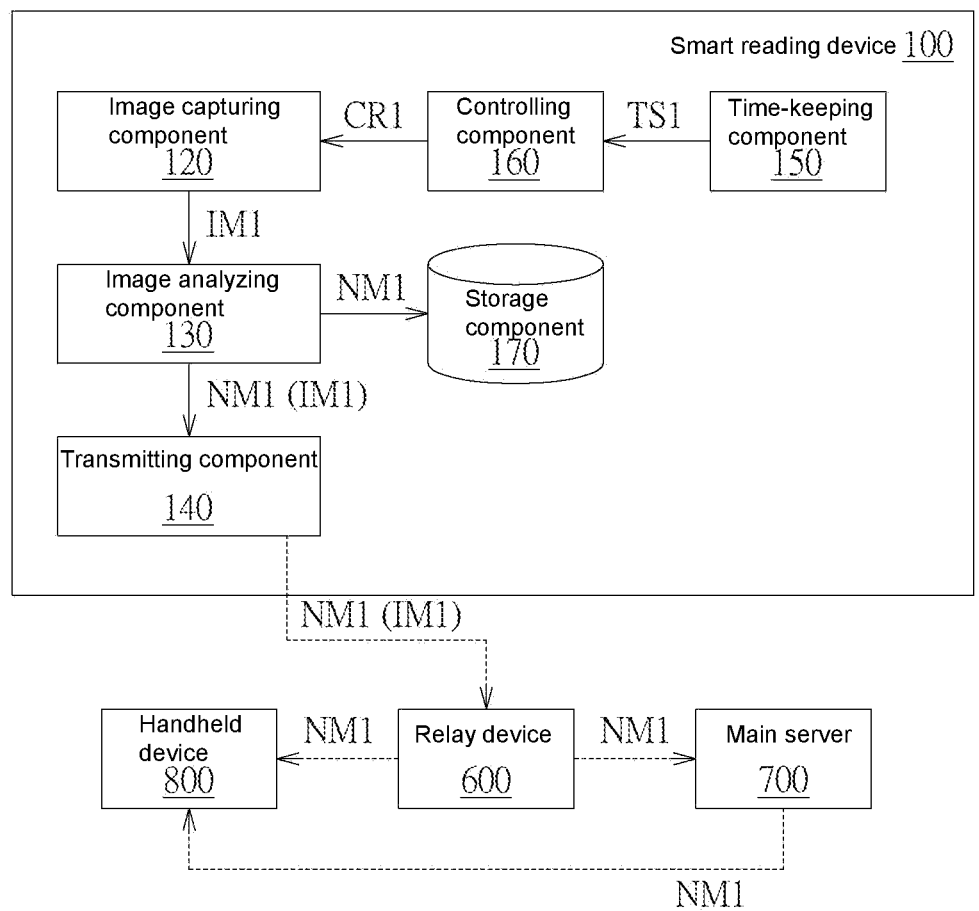
FIG. 5 shows a block diagram of the smart reading device of FIG. 1.

Referring to FIG. 5, FIG. 5 shows a block diagram of the smart reading device 100 in FIG. 1. The smart reading device 100 includes a fixing component 110, an image capturing component 120, an image analyzing component 130, a transmitting component 140, a time-keeping component 150, a controlling component 160, and a storage component 170. The main functions of each of the components are described as follows.

The fixing component 110 is used to be fixed onto the water meter 900. The fixing component 110 is (but is not limited to), for example, a clamping component, a magnetic component, a locking component, an elastic connecting component, various components and structures with a fixing function, etc.

The image capturing component 120 is used for capturing images. The image capturing component 120 is (but is not limited to), for example, a camera, a lens, a digital photosensitive component, various components with an image capturing function, etc.

The image analyzing component 130 is used for executing image analyzing procedures. The image analyzing component 130 is (but not limited to), for example, a chip, a circuit board, a circuit, a firmware, or a storage device which stores multiple sets of codes.

The transmitting component 140 is used for transmitting components. The transmitting component 140 is (but not limited to), for example, a Bluetooth transmission module, a LoRa radio frequency module, a Wifi module, or a transmission line.

The time-keeping component 150 is used for counting time. The time-keeping component 150 is (but not limited to), for example, a chip, a circuit board, a circuit, a firmware, or a storage device which stores multiple sets of codes.

The controlling component 160 is used for controlling the operations of the image capturing component 120 and the transmitting component 140. The controlling component 160 is (but not limited to), for example, a chip, a circuit board, a circuit, a firmware, or a storage device which stores multiple sets of codes.

The storage component 170 is used for storing various kinds of pieces of data. The storage component 170 is (but not limited to), for example, a memory. The following is a detailed description of the operation method of each of the components of the smart reading device 100 with an accompanying flow chart.

Figure 6:
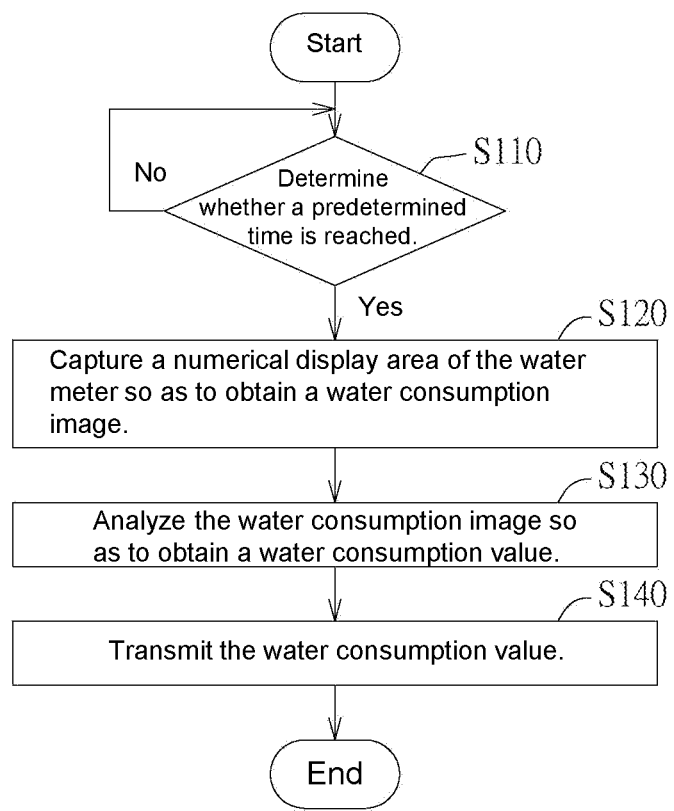
FIG. 6 shows a flow chart of a controlling method of the smart reading device according to (but not limited to) an embodiment.

Referring to FIG. 6, FIG. 6 shows a flow chart of a controlling method of the smart reading device 100 according to (but not limited to) an embodiment. The following describes the operation of each step of the flow chart with the block diagram of FIG. 5. First, in a step S110, the controlling component 160 determines whether a predetermined time is reached. The predetermined time is, for example, one month, one week, or one day. As shown in FIG. 6, if the predetermined time is reached, the flow proceeds to a step S120; if the predetermined time is not reached, the flow returns to the step S110. As shown in FIG. 5, the time-keeping component 150 provides a time signal TS1 to the controlling component 160, and the controlling component 160 learns whether the predetermined time is reached according to the time signal TS1. The time signal TS1 is (but not limited to), for example, time accumulation information (such as 502 minutes accumulated, 678 minutes accumulated, etc.), or standard time information (such as 1:00, March 5th, etc.).

Then, in the step S120, the controlling component 160 outputs a controlling signal CR1 to the image capturing component 120, so that the image capturing component 120 captures the numerical display area R1 (shown in FIG. 2) of the water meter 900, so as to obtain a water consumption image IM1. The water consumption image IM1 is (but not limited to), for example, a monochrome image, a color image, or a monochrome grayscale image.

Then, in a step S130, the water consumption image IM1 is analyzed so as to obtain the water consumption value NM1. In the step S130, the water consumption value NM1 is identified through, for example, (but not limited to) an optical character recognition technology. Or in an embodiment, the water consumption value NM1 is identified through, for example, (but not limited to) a deep learning model. In the step S130, the image analyzing component 130 may be used for executing this step, and the relay device 600 may also be used for executing this step.

In an embodiment, when the difference between the water consumption value NM1 analyzed and obtained by the image analyzing component 130 and the previous water consumption value NM1 exceeds a predetermined value, it means that an error exists in the analysis, and the step S120 needs to be re-executed, so as to obtain the water consumption image IM1 and conduct the analysis again. If the water consumption value NM1 obtained by the analysis is less than the previous water consumption value NM1, an error also exists, and the step S120 needs to be re-executed. The predetermined value may be set remotely. In an embodiment, if the water consumption image IM1 has an angular deviation, the image analyzing component 130 or the relay device 600 obtains a rotation angle according to the water consumption image IM1, and rotates the water consumption image IM1 according to the rotation angle.

If the step S120 is re-executed five times (five images are captured in one minute, for example) and the water consumption values NM1 obtained by the analyses are all out of range, the water consumption value NM1 is still uploaded.

Then, in a step S140, the relay device 600 transmits the water consumption value NM1 to the main server 700 or the handheld device 800. In an embodiment, the smart reading device 100 may not execute the step of analyzing and obtaining the water consumption value NM1, and may directly transmit the water consumption image IM1 to the main server 700 or the handheld device 800 through the transmitting component 140. This method consumes more power, but the smart reading device 100 may not need to be configured with the image analyzing component 130. Compared with the method of transmitting the water consumption image IM1, the method of analyzing and transmitting the water consumption value NM1 is more power-efficient.

In (but not limited to) an embodiment, the transmitting component 140 may transmit the water consumption value NM1 (or the water consumption image IM1) to the relay device 600 through Bluetooth technologies. Or in (but not limited to) another embodiment, the transmitting component 140 may transmit the water consumption value NM1 (or the water consumption image IM1) to the relay device 600 through LoRa technologies. In an embodiment, when the transmitting component 140 transmits the water consumption value NM1, if the transmission is not successful in the first time, the relay device 600 may repeat the transmission for a predetermined number of times until the transmission is successful.

In another embodiment, the water consumption value NM1 may be stored in the storage component 170 or the relay device 600 of the smart reading device 100. Users may proactively obtain the complete water consumption value NM1 from the storage component 170 or the relay device 600.

Figure 7:
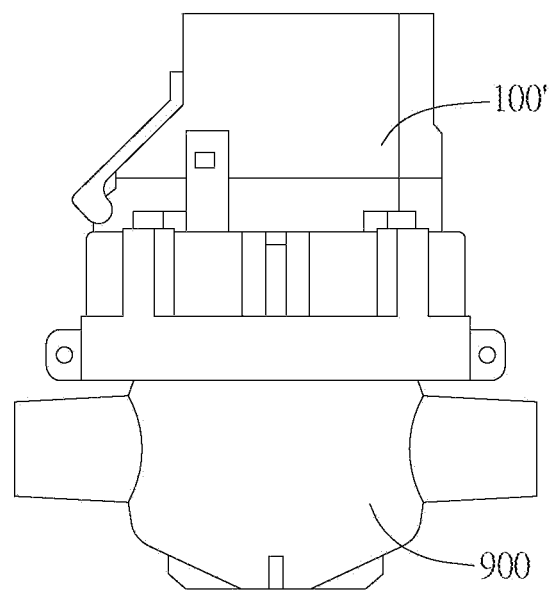
FIG. 7 shows a schematic view of a smart reading device and a water meter according to (but not limited to) another embodiment.
Figure 8:
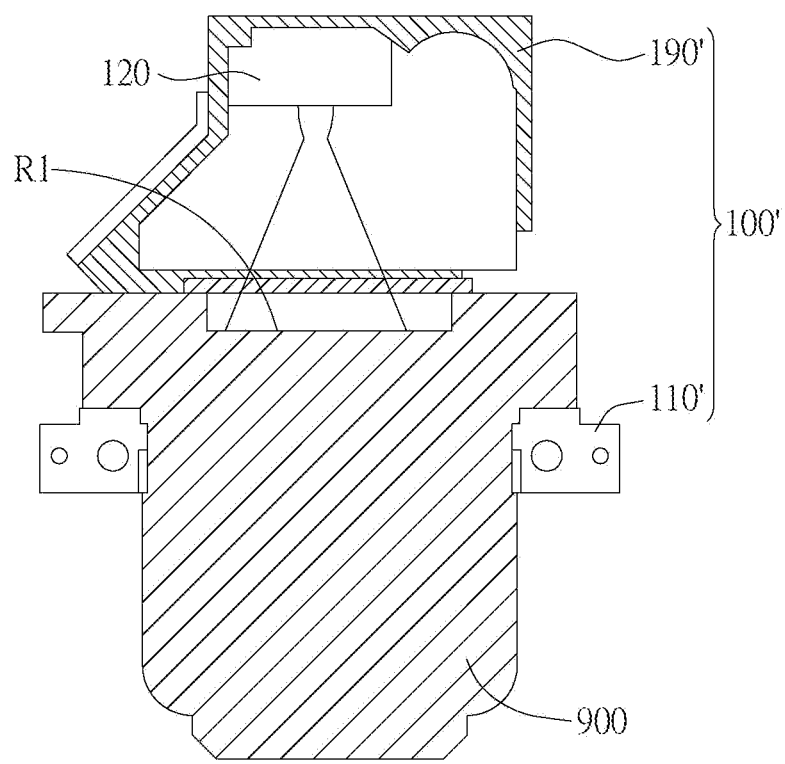
FIG. 8 shows a cross-sectional view of the smart reading device and the water meter of FIG. 7.

Referring to FIGS. 7 to 8, FIG. 7 shows a schematic view of a smart reading device 100' and the water meter 900 according to (but not limited to) another embodiment, and FIG. 8 shows a cross-sectional view of the smart reading device 100' and the water meter 900 according to FIG. 7. The smart reading device 100' of this embodiment may also be directly installed onto the traditional water meter 900. Consumers can equip the traditional water meter 900 with the functions of a smart water meter without having to replace the original water meter 900 or spend high costs on construction. In this way, the smart reading device 100 may be widespread in various homes and places so as to effectively control and manage water resources.

Figure 9:
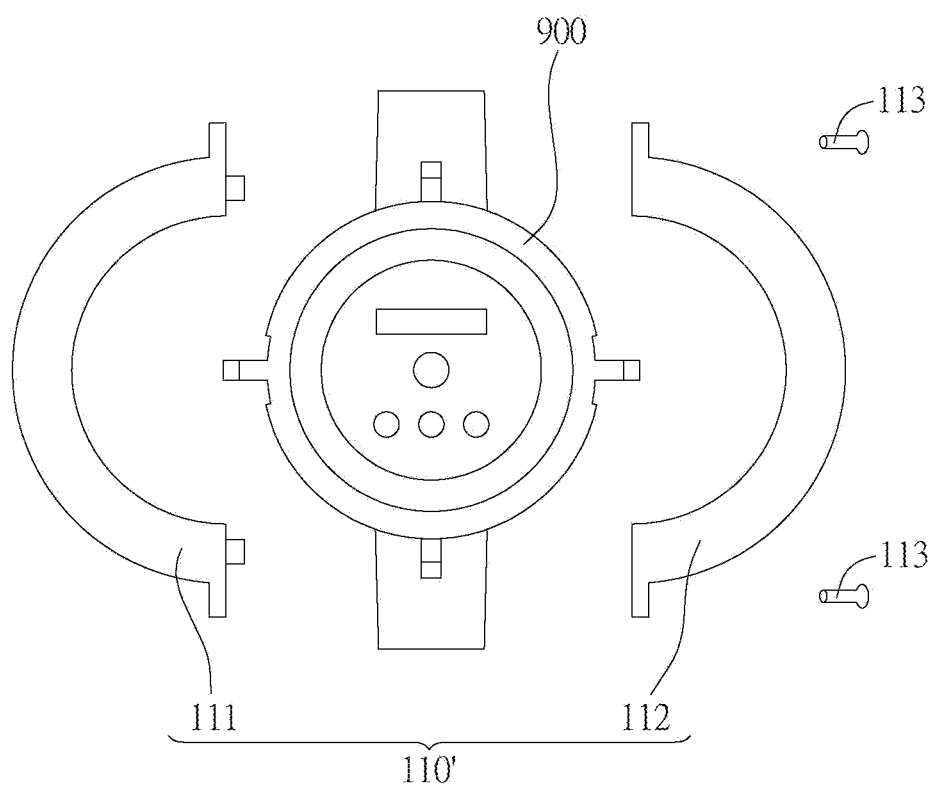
FIGS. 9 to 12 show schematic views of assembly of the smart reading device of FIG. 7.
Figure 10:
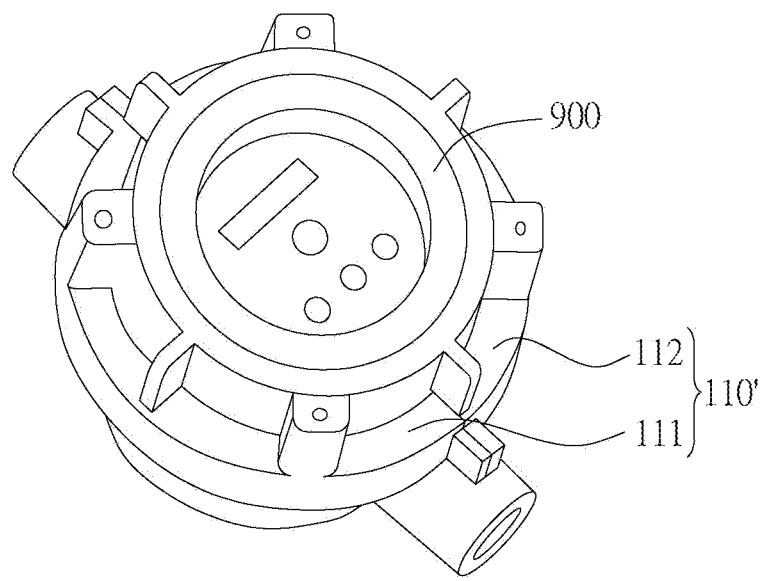

Referring to FIGS. 9 to 12, FIGS. 9 to 12 show schematic views of assembly of the smart reading device 100' of FIG. 7. First, as shown in FIGS. 9 to 10, in an embodiment, a fixing component 110' may be (but not limited to) formed by two semicircular clamping structures 111 and 112. The clamping structure 111 and the clamping structure 112 clamp the water meter 900 from both sides of the water meter 900. Screws 113 are used for locking the clamping structure 111 and the clamping structure 112 onto the water meter 900 so that the clamping structure 111 and the clamping structure 112 are tightly fitted to the water meter 900.

In (but not limited to) another embodiment, the clamping structure 111 and the clamping structure 112 may be magnetic, so as to be directly attached to the outer side wall of the water meter 900.

In (but not limited to) another embodiment, the clamping structure 111 and the clamping structure 112 may be flexible so as to match various water meters of different sizes.

Figure 11:
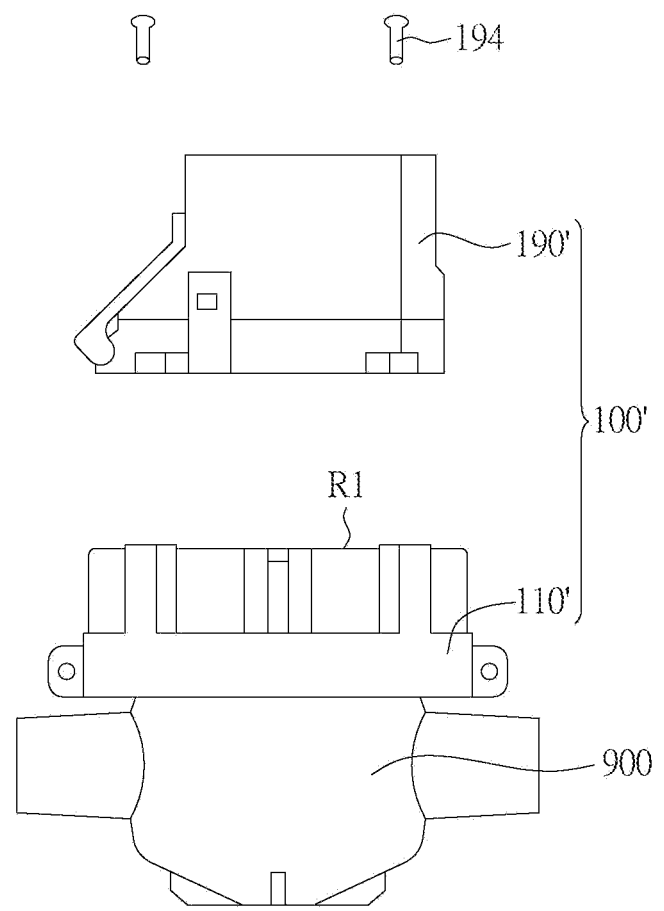
Figure 12:
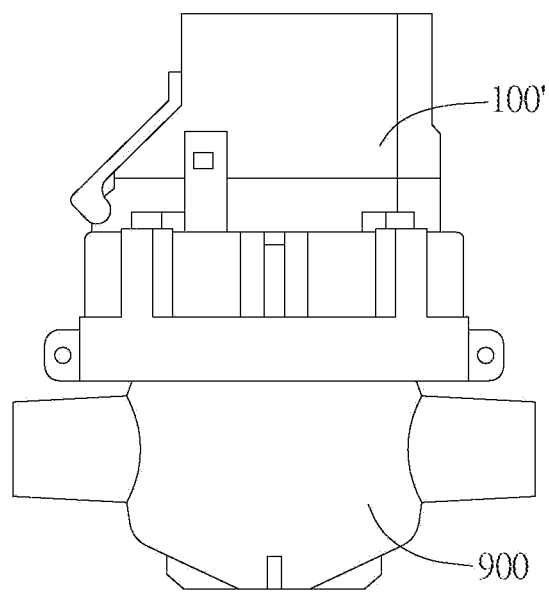

Next, as shown in FIGS. 11 to 12, a casing 190' of the smart reading device 100' is locked to the fixing component 110 from above through the screws 194.

Through the aforementioned assembly method, the water meter 900 does not need to be changed in structure, and users may easily assemble the smart reading device 100' on the water meter 900.

According to the aforementioned description, the smart reading device 100 and the smart reading device 100' of the aforementioned embodiments may be directly installed on the traditional water meter 900. Users can equip the traditional water meter 900 with the functions of a smart water meter without having to remove the original water meter 900 or spend high costs on construction. In this way, the smart reading device 100 and the smart reading device 100' may be widespread in various homes and places so as to effectively control and manage water resources.

Figure 13:
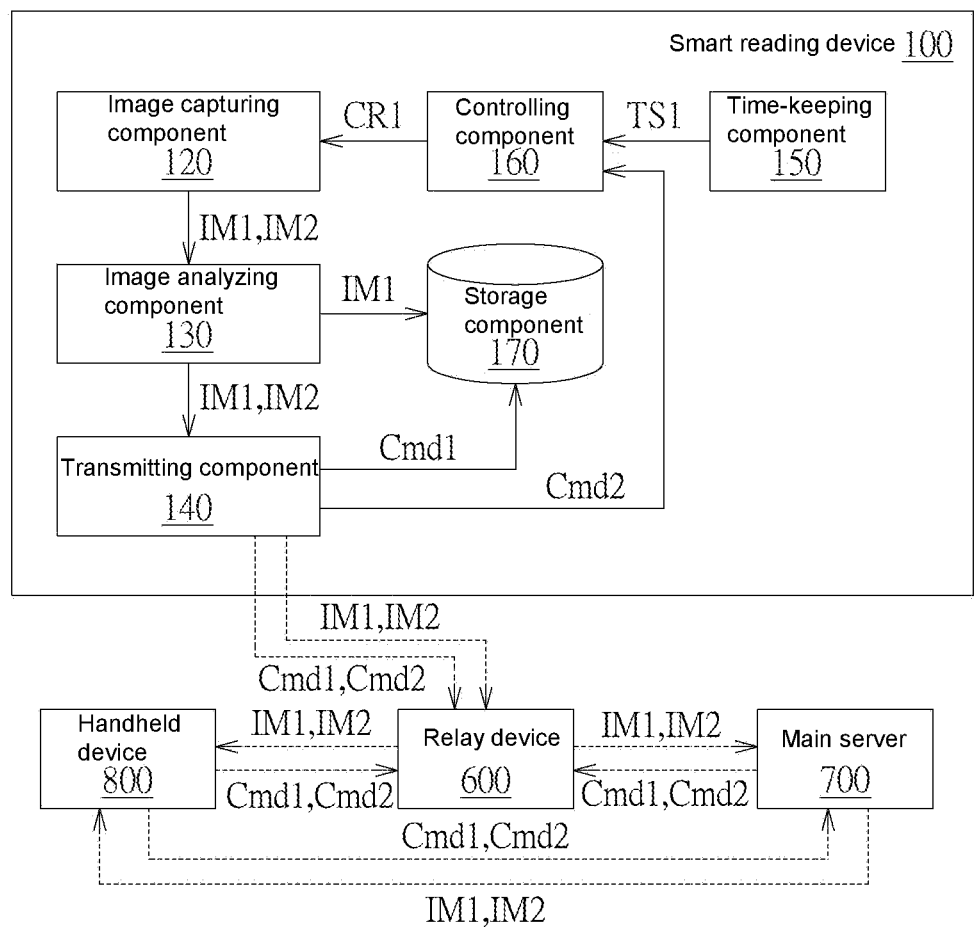
FIG. 13 shows a block diagram of the smart reading device according to an embodiment.

Referring to FIG. 13, FIG. 13 shows a block diagram of the smart reading device according to an embodiment. The smart reading device 100 includes a fixing component 110, an image capturing component 120, an image analyzing component 130, a transmitting component 140, a time-keeping component 150, a controlling component 160, and a storage component 170. The main functions of each of the components are the same as the aforementioned and are omitted herein. In an embodiment, the smart reading device 100 may provide the water consumption image IM1 and a water consumption image IM2 to the handheld device 800, so that users may directly view the water consumption image IM1 and the water consumption image IM2 or save the water consumption image IM1 and the water consumption image IM2 through the handheld device 800. In an embodiment, the smart reading device 100 may provide the water consumption image IM1 captured at a specific time to the handheld device 800, and the water consumption image IM1 is used for obtaining the water consumption value NM1. In an embodiment, the smart reading device 100 may provide the water consumption image IM2 captured at any time to the handheld device 800 according to users' needs. In an embodiment, the handheld device 800 may transmit an image reporting instruction Cmd1 or an image reporting instruction Cmd2 to the transmitting component 140 through the relay device 600. The transmitting component 140 transmits the water consumption image IM1 or the water consumption image IM2 to the handheld device 800 through the relay device 600 in response to receiving the image reporting instruction Cmd1 or the image reporting instruction Cmd2.

Specifically, when the controlling component 160 learns that the predetermined time is reached according to the time signal TS1, the controlling component 160 controls the image capturing component 120 through the controlling signal CR1 to capture the numerical display area R1 of the water meter 900, so as to obtain the water consumption image IM1 captured at a specific time. The storage component 170 may be used for recording the water consumption image IM1 captured at a specific time. When users want to obtain the water consumption image IM1 captured at a specific time, the handheld device 800 may transmit the image reporting instruction Cmd1 to the transmitting component 140 through the relay device 600, so as to notify the smart reading device 100 to transmit back the water consumption image IM1. Therefore, in response to receiving the image reporting instruction Cmd1 from the relay device 600, the transmitting component 140 transmits the water consumption image IM1 stored in the storage component 170 to the handheld device 800 through the relay device 600.

On the other hand, the handheld device 800 may control the smart reading device 100 through the image reporting instruction Cmd2 to instantly execute image capturing actions, so that users may obtain the water consumption image IM2 captured at any time through the handheld device 800. When users want to obtain the water consumption image IM2 at the current time, the handheld device 800 may transmit the image reporting instruction Cmd2 to the transmitting component 140 through the relay device 600, so that the transmitting component 140 receives the image reporting instruction Cmd2 from the relay device 600. The controlling component 160 controls the image capturing component 120 to capture images according to the image reporting instruction Cmd2. In other words, in response to receiving the image reporting instruction Cmd2, the controlling component 160 controls the image capturing component 120 through the controlling signal CR1 to capture the numerical display area R1 of the water meter 900, so as to obtain the water consumption image IM2 captured at the current time. Then, the transmitting component 140 may transmit the water consumption image IM2 captured at the current time to the handheld device 800 through the relay device 600 in response to the image reporting instruction Cmd2.

It is to be noted that, in an embodiment, the handheld device 800 may directly transmit the image reporting instruction Cmd1 and the image reporting instruction Cmd2 to the relay device 600. Or in an embodiment, the handheld device 800 may transmit the image reporting instruction Cmd1 and the image reporting instruction Cmd2 to the main server 700, and then the image reporting instruction Cmd1 and the image reporting instruction Cmd2 may be transmitted to the relay device 600 through the main server 700.

Figure 14:
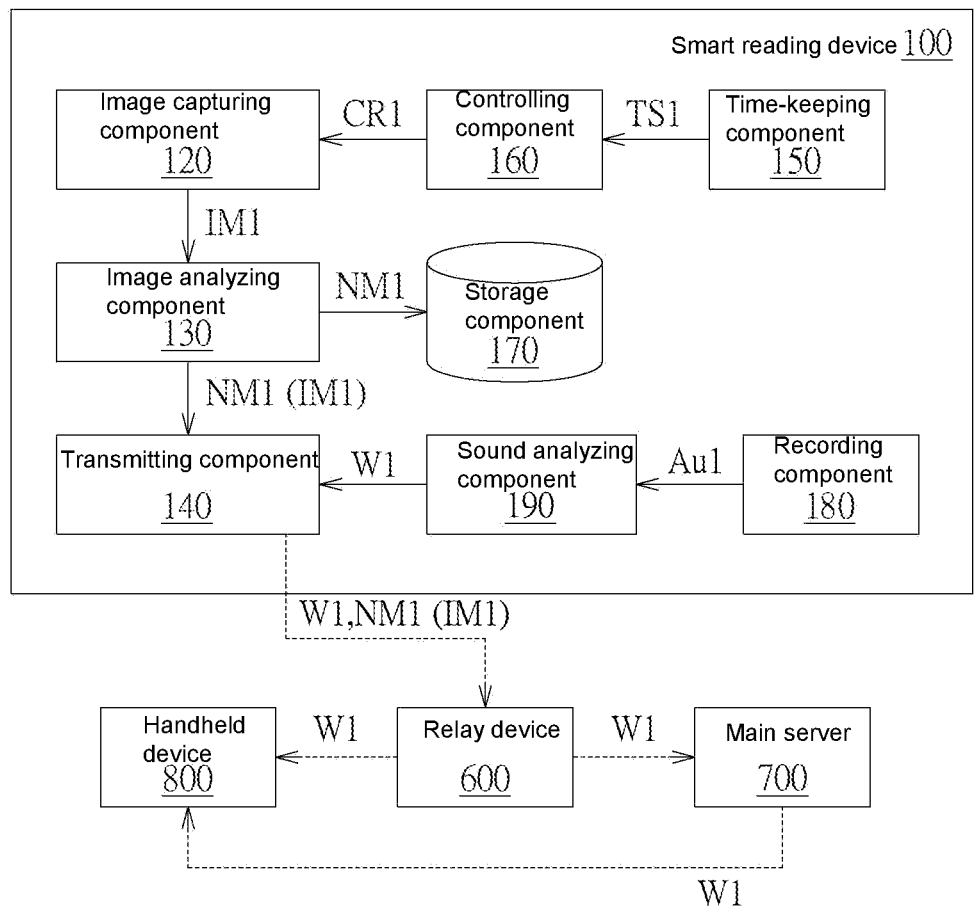
FIG. 14 shows a block diagram of the smart reading device according to an embodiment.

Referring to FIG. 14, FIG. 14 shows a block diagram of the smart reading device according to an embodiment. In an embodiment, the smart reading device 100 includes a recording component 180 and a sound analyzing device 190 in addition to a fixing component 110, an image capturing component 120, an image analyzing component 130, a transmitting component 140, a time-keeping component 150, a controlling component 160, and a storage component 170.

The recording component 180 is used for recording sounds and may include a microphone. In an embodiment, the aforementioned microphone may be a directional microphone. The directional microphone receives sounds in a specific direction clearly and suppresses environmental noise. The recording component 180 is configured in the casing 190, and the recording component 180 is used for recording and obtaining a sound signal Au1. Specifically, when water flows through the water meter 900, the mechanical components inside the water meter 900 execute relative actions. For example, the water flow drives an impeller inside the water meter 900 to rotate. When the water flow drives the mechanical components inside the water meter 900 to execute the relative actions, the mechanical components inside the water meter 900 make sounds. The recording component 180 may record the sounds of the water flow and the sounds made by the mechanical components inside the water meter 900.

The sound analyzing device 190 is used for executing a sound analyzing procedure. The sound analyzing device 190 is (but not limited to), for example, a chip, a circuit board, a circuit, a firmware, or a storage device which stores multiple sets of codes. The sound analyzing device 190 may analyze the sound signal Au1 provided by the recording component 180, and obtain the sound characteristics of the aforementioned sound signal Au1, such as the volume or the audio frequency thereof. In addition, in an embodiment, the sound analyzing device 190 may also execute denoising processing or other audio frequency processing on the sound signal Au1 provided by the recording component 180. In an embodiment, the sound analyzing device 190 may determine the water leakage state according to the sound characteristics of the sound signal Au1, and release a water leakage warning message W1 according to the result of the determination. The water leakage warning message W1 may be transmitted to the handheld device 800 through the relay device 600 to notify users.

Specifically, when a water pipe is old and leaks or when users forget to turn off a water outlet device (such as a faucet), even if the users are not using water, the water meter 900 continues to accumulate the water consumption value, which brings unnecessary financial loss and waste of water to the water users. In an embodiment, the sound analyzing device 190 may determine the water leakage state according to the sound characteristics of the sound signal Au1, and release the water leakage warning message W1 according to the result of the determination. Therefore, users may instantly know whether an unexpected water usage occurs through the handheld device 800.

In an embodiment, the sound analyzing device 190 may determine the water leakage state according to the volume of the sound signal Au1. Normally, when users stop using water, the mechanical components inside the water meter 900 stop acting. When the mechanical components inside the water meter 900 stop acting, the volume of the sound signal Au1 should be less than a threshold value. Therefore, the sound analyzing device 190 may determine whether to release the water leakage warning message W1 by comparing the volume of the sound signal Au1 with the aforementioned threshold value.

Figure 15:
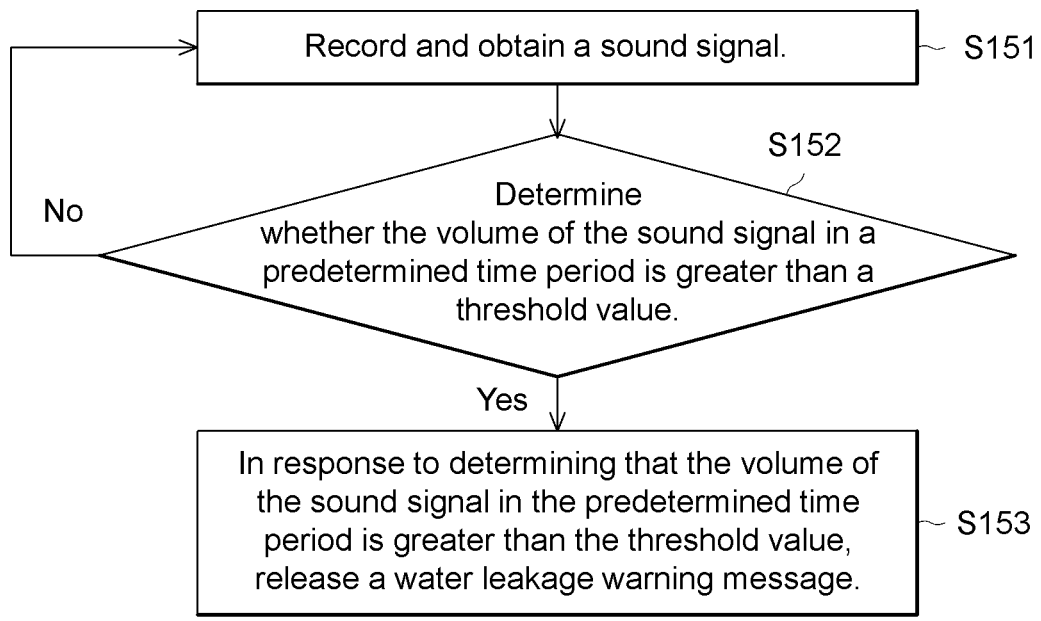
FIG. 15 shows a flow chart of detecting a water leakage according to an embodiment.

Referring to FIG. 15, FIG. 15 shows a flow chart of detecting a water leakage according to an embodiment. In an embodiment, in a step S151, the recording component 180 records and obtains the sound signal Au1. In a step S152, the sound analyzing device 190 determines whether the volume of the sound signal Au1 in a predetermined time period is greater than the threshold value. The aforementioned predetermined time period may be a time period when water is not used set by users or a time period when water is not used estimated by a specific algorithm. The length of the predetermined time period is not limited. The length of the predetermined time period may be, for example, 2 minutes, 5 minutes, 10 minutes, etc. For example, the time period when water is not used may be a time period when users are not at home or a late-night time period, such as from 3:00 a.m. to 3:05 a.m. During the time period when water is not used, the mechanical components inside the water meter 900 should stop acting so that the volume of the sound signal Au1 is less than the threshold value. When an unexpected water flow passes through the water meter 900, the mechanical components inside the water meter 900 act accordingly so that the volume of the sound signal Au1 is greater than the threshold value. Therefore, if it is determined in the step S152 that the volume of the sound signal Au1 in a predetermined time period is greater than the threshold value, in a step S153, in response to the sound analyzing component 190 determining that the volume of the sound signal Au1 in a predetermined time period is greater than the threshold value, the transmitting component 140 releases a water leakage warning message W1. On the contrary, if it is determined in the step S152 that the volume of the sound signal Au1 in a predetermined time period is not greater than the threshold value, the transmitting component 140 does not release the water leakage warning message W1.

Figure 16:
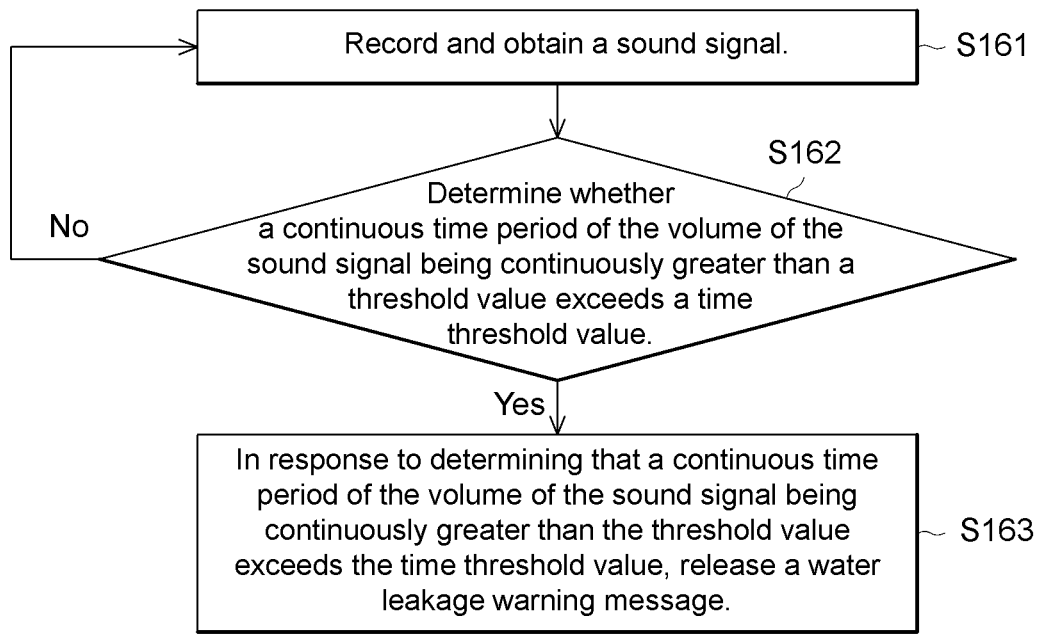
FIG. 16 shows a flow chart of detecting a water leakage according to an embodiment.

Referring to FIG. 16, FIG. 16 shows a flow chart of detecting a water leakage according to an embodiment. In an embodiment, in a step S161, the recording component 180 records and obtains the sound signal Au1. In a step S162, the sound analyzing device 190 determines whether a continuous time period of the volume of the sound signal Au1 being continuously greater than the threshold value exceeds a time threshold value. Specifically, users using water should be a non-continuous event. In other words, the continuous time period of the mechanical components acting inside the water meter 900 normally does not exceed the time threshold value. The aforementioned time threshold value is, for example, 3 hours, 5 hours, 12 hours, etc., and is not limited thereto. When the continuous time period of the mechanical components acting inside the water meter 900 exceeds the time threshold value, it means that an unexpected water flow passes through the water meter 900. Therefore, if it is determined in the step S162 that a continuous time period of the volume of the sound signal Au1 being continuously greater than the threshold value exceeds the time threshold value, in the step S163, in response to the sound analyzing component 190 determining that the continuous time period of the volume of the sound signal Au1 being continuously greater than the threshold value exceeds the time threshold value, the transmitting component 140 releases the water leakage warning message W1. On the contrary, if it is determined in the step S162 that the continuous time period of the volume of the sound signal Au1 being continuously greater than the threshold value does not exceed the time threshold value, the transmitting component 140 does not release the water leakage warning message W1.

Finally, it is to be noted that the above embodiments are used only to illustrate but not to limit the technical solutions of the disclosure; although the disclosure has been described in detail with reference to the aforementioned embodiments, people skilled in the art should understand: it is still possible to modify the technical solutions described in the aforementioned embodiments, or to equivalently replace some or all of the technical features; and these modifications or replacements do not cause the essence of the corresponding technical solutions to deviate from the scope of the technical solutions of the embodiments of the disclosure.

What is claimed is:

1. A smart reading device of a water meter, comprising:
   a fixing component adapted for being fixed onto the water meter;
   a casing disposed on the fixing component;
   an image capturing component disposed in the casing, wherein the image capturing component is adapted for capturing a numerical display area of the water meter so as to obtain a water consumption image;
   an image analyzing component, wherein the water consumption image is analyzed through the image analyzing component or a relay device to obtain a water consumption value; and a transmitting component adapted for transmitting the water consumption value or the water consumption image to the relay device,
wherein the smart reading device further comprises:
a recording component disposed in the casing, wherein the recording component is adapted for recording and obtaining a sound signal; and
a sound analyzing component determining a water leakage state according to the sound signal,
wherein in response to the sound analyzing component determining that a volume of the sound signal in a predetermined time period is greater than a threshold value, the transmitting component releases a water leakage warning message.

2. The smart reading device of the water meter according to claim 1, further comprising:
a time-keeping component adapted for providing a time signal; and
a controlling component controlling the image capturing component to capture images according to the time signal.

3. The smart reading device of the water meter according to claim 1, further comprising:
a luminous component adapted for providing a light source for the numerical display area.

4. The smart reading device of the water meter according to claim 3, wherein the casing comprises:
a base;
a top board connected to the base, wherein the top board has a convex lens; and
a flip cover connected to the top board, wherein when the flip cover is opened, the luminous component is activated for a user to view the numerical display area.

5. The smart reading device of the water meter according to claim 1, wherein the image analyzing component identifies the water consumption value through a deep learning model or an optical character recognition technology.

6. The smart reading device of the water meter according to claim 1, wherein if the water consumption image has an angular deviation, the image analyzing component or the relay device obtains a rotation angle according to the water consumption image, and rotates the water consumption image according to the rotation angle.

7. The smart reading device of the water meter according to claim 1, wherein the relay device transmits the water consumption value to a main server.

8. The smart reading device of the water meter according to claim 1, further comprising:
a storage component adapted for recording the water consumption image captured at a specific time,
wherein the transmitting component transmits the water consumption image to a handheld device through the relay device in response to receiving an image reporting instruction from the relay device.

9. The smart reading device of the water meter according to claim 1, further comprising:
a controlling component controlling the image capturing component to capture images according to an image reporting instruction, wherein the transmitting component receives the image reporting instruction from the relay device, and transmits the water consumption image to a handheld device through the relay device in response to the image reporting instruction.

10. The smart reading device of the water meter according to claim 1, wherein a handheld device transmits an image reporting instruction to the transmitting component through the relay device, and the transmitting component transmits the water consumption image to the handheld device through the relay device in response to receiving the image reporting instruction.

11. The smart reading device of the water meter according to claim 1, wherein in response to the sound analyzing component determining that a continuous time period of a volume of the sound signal being continuously greater than a threshold value exceeds a time threshold value, the transmitting component releases a water leakage warning message.

12. A controlling method of a smart reading device of a water meter, wherein the smart reading device is installed on the water meter, the controlling method comprising:
determining whether a predetermined time is reached;
capturing a numerical display area of the water meter to obtain a water consumption image if the predetermined time is reached;
analyzing the water consumption image through an image analyzing component or a relay device so as to obtain a water consumption value; and
transmitting the water consumption value,
wherein the controlling method further comprises:
recording with a recording component to obtain a sound signal; and
determining a water leakage state according to the sound signal,
wherein in determining the water leakage state according to the sound signal, in response to determining that a volume of the sound signal in a predetermined time period is greater than a threshold value, a water leakage warning message is released.

13. The controlling method of the smart reading device of the water meter according to claim 12, wherein in determining the water leakage state according to the sound signal, in response to determining that a continuous time period of a volume of the sound signal being continuously greater than a threshold value exceeds a time threshold value, a water leakage warning message is released.

14. The controlling method of the smart reading device of the water meter according to claim 12, further comprising:
in response to receiving an image reporting instruction from the relay device, capturing a numerical display area of the water meter so as to obtain another water consumption image; and
transmitting the another water consumption image to a handheld device through the relay device.

15. The controlling method of the smart reading device of the water meter according to claim 12, wherein in capturing the numerical display area of the water meter, a light source is further provided.

16. The controlling method of the smart reading device of the water meter according to claim 12, wherein in analyzing the water consumption image, the water consumption value is identified through a deep learning model or an optical character recognition technology.

17. The controlling method of the smart reading device of the water meter according to claim 12, wherein in analyzing the water consumption image, if the water consumption image has an angular deviation, a rotation angle is obtained according to the water consumption image, and the water consumption image is rotated according to the rotation angle.

18. The controlling method of the smart reading device of the water meter according to claim 12, wherein the water consumption value is transmitted to a main server.

19. The controlling method of the smart reading device of the water meter according to claim 12, wherein the smart reading device is fixed to the water meter through a fixing component, and the fixing component is a locking structure fitted around the water meter.

20. The controlling method of the smart reading device of the water meter according to claim 19, wherein the fixing component is adjusted according to a size and a type of the water meter to be fixed onto various sizes and types of the water meter.

21. The controlling method of the smart reading device of the water meter according to claim 12, further comprising:
  recording the water consumption image captured at a specific time; and
  in response to receiving an image reporting instruction from the relay device, transmitting the water consumption image to a handheld device through the relay device.

\* \* \* \* \*